United States Patent [19]

Colten

[11] 4,190,761
[45] Feb. 26, 1980

[54] HEAT LOSS CONTROL SYSTEM FOR BUILDING HEAT SUMPS

[75] Inventor: Jerrold L. Colten, Lakeville, Ind.

[73] Assignee: Bristol Products Inc., Bristol, Ind.

[21] Appl. No.: 16,286

[22] Filed: Feb. 28, 1979

[51] Int. Cl.² .............................................. H05B 1/00
[52] U.S. Cl. ...................................... 219/213; 165/45
[58] Field of Search .................... 219/213; 126/400; 165/45; 237/1 A; 52/169.11

[56] References Cited

U.S. PATENT DOCUMENTS

| | | | |
|---|---|---|---|
| 2,332,227 | 10/1943 | Jackson | 165/45 X |
| 3,527,921 | 9/1970 | Voglesonger | 219/213 |
| 4,000,851 | 1/1977 | Heilemann | 165/45 X |
| 4,117,305 | 9/1978 | Colten | 219/213 |

FOREIGN PATENT DOCUMENTS

| | | |
|---|---|---|
| 1565202 | 2/1970 Fed. Rep. of Germany | 219/213 |
| 2351080 | 4/1975 Fed. Rep. of Germany | 219/213 |

OTHER PUBLICATIONS

J. F. McPartland, Electric Radiant Heating in Floor, "Electrical Construction and Maintenance", vol. 69, No. 9, pp. 110–113, 9/70.

*Primary Examiner*—C. L. Albritton
*Attorney, Agent, or Firm*—Marmaduke A. Hobbs

[57] ABSTRACT

A heat loss control system for a building having a sump of fill material which is heated by an electric heating cable, and a floor disposed on the fill material. A layer of porous material such as coarse sand having air spaces therein is disposed between the fill material and the earth, and a system of perforated tubes or the like is disposed in said layer, and water in the layer is removed by a pump attached to the perforated tubes. As the water is removed from the layer, air fills the porous material and forms an effective insulation to prevent the heat in the fill material from being dissipated into the earth beneath the sump. The heating cable may be disposed in the fill material or in the floor supported by the fill material. Probes are preferably inserted in the layer and connected either to a guage or to the motor for the pump, so that the pump will be operated when it is necessary to remove the moisture and improve the insulating characteristics of the layer.

12 Claims, 2 Drawing Figures

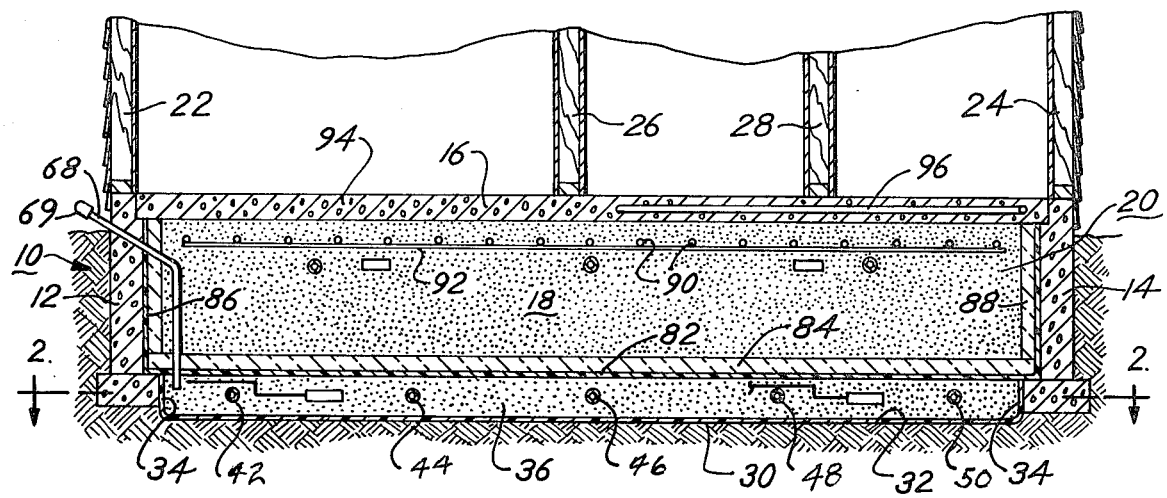
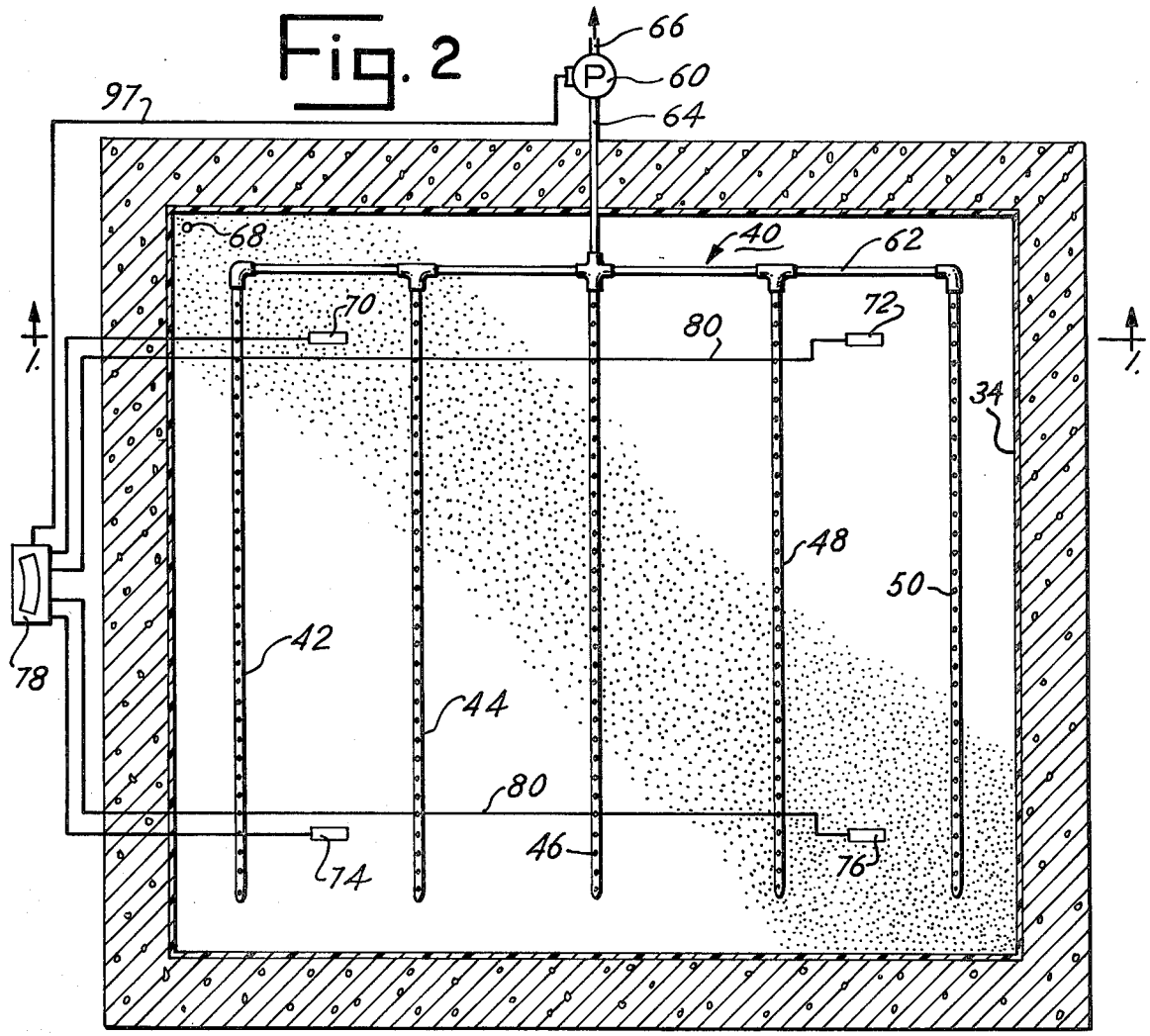

HEAT LOSS CONTROL SYSTEM FOR BUILDING HEAT SUMPS

One type of electrical heating system for homes consists of an electrical heating cable buried in sand or other material forming a heat sump beneath a concrete slab floor, the material beneath the floor storing the heat generated from time to time by the electrical heating system, and gradually releasing the heat through the concrete floor throughout the day and night. This type of heating system usually provides a rather uniform heat supply to the living space of the building and is generally more economical than the conventional electrical heating system, which primarily heats the air in the living space from a centrally located heating unit, or by separate space heating units in the various rooms of the house. The use of the electrical system to heat the material beneath the floor permits the electrical system to be operated during the hours of low electrical demand from the electric power companies, and to be inoperative or on low output during times of peak demand. Further, radiation of heat from the material below the floor upwardly through the floor supplies heat where it is most needed and best utilized for effective heating of the living space and for optimum comfort to those in the living space.

While the heat storage type system just described has a number of advantages, there are some disadvantages which decrease the potential efficiency, and hence the acceptance of that type of system in homes of business establishments where it could otherwise effectively be used. One of the problems of the foregoing electric heating systems is the loss of heat downwardly into the earth or ground, in that the only effective barrier from such loss has been the thermal impedance of the earth, which is usually wet or damp and transfers the heat rapidly away from the heat sump. Since the normal ground temperature is approximately 55 degrees, which is substantially below the temperature which must be maintained in the heat sump beneath the floor for effectively heating the living space, there is significant downward flow of heat which can never be recovered to any appreciable degree, regardless of the length of time the system is in operation. This downward heat loss is aggravated by the presence of a substantial amount of moisture in the earth beneath the heat sump material in which the electrical cable is embedded. It is therefore one of the principal objects of the present invention to provide a heat sump system for building structures, which effectively minimizes the heat loss from the system to the earth, particularly to the earth beneath the system, and which is economical to construct and operate.

Another object of the invention is to provide a heat sump system having a barrier which prevents or minimizes the flow of heat from the system downwardly into the earth and which substantially improves the performance and efficiency of the aforementioned type of heating system.

Still another object is to provide a heat sump system of the aforesaid type which is simple in construction and operation and will operate virtually trouble-free over extended periods of time, and which is responsive to the heat requirements of the living space above the sump system and can easily be controlled to maintain the system at optimum performance.

The invention is primarily concerned with a heating system in which an electric heating cable is buried in fill material, such as sand, beneath a concrete slab floor to form a heat sump. The heating cable heats the material in the sump, which is preferably about one to three feet in depth and is confined on all lateral sides by a retainer wall, normally of concrete and usually the foundation of the building structure. The present concept involves a thermal barrier system to eliminate or minimize the loss of heat downwardly into the earth below the fill material in the sump, so that substantially all of the heat generated by the electric heating cable is available for radiating upwardly from the fill material and through the floor into the living space of the building structure, thereby reducing the amount of electrical energy required to maintain the heat sump at optimum operating temperature. While the foundation forming the lateral sides of the heat sump serves as a barrier to exclude moisture and to reduce heat loss between the fill material and the surrounding earth and/or atmosphere, preferably an additional barrier to both moisture and heat loss is included along the lateral sides, normally along the inside surface of the foundation.

A number of objects of the invention have been set forth hereinabove, and other objects and advantages of the invention will become apparent from the following description and accompanying drawing, wherein:

FIG. 1 is a vertical cross sectional view through a lower portion of a building such as a home, showing the foundation and footings in the ground, and a heat sump with an electrical heating cable embedded in the material beneath a concrete floor slab, and with the present heat loss control system installed below the material; and FIG. 2 is a horizontal cross sectional view of the heat loss control system, the section being taken on line 2—2 of FIG. 1.

Referring more specifically to the drawings, the building structure shown consists basically of a foundation 10 having vertical side walls 12 and 14, and a floor 6 consisting of a concrete slab laid on fill material 18 which forms a part of the heat sump indicated generally by numeral 20. Outside walls 22 and 24 and wall partitions 26 and 28 are shown supported by the foundation and the concrete slab. Foundation walls 12 and 14 are supported by footings poured in trenches made at the time the excavation for the building is made. For the purpose of the present invention, this construction is considered conventional and will not be described in further detail. The present heat sump system is adaptable to a variety of different types of buildings, including single and multiple family homes, and commercial and industrial buildings; however, the description herein will be directed primarily to the application of the invention to home structures.

When an installation of the present invention is made, the earth is excavated to the point near the footing of the foundation and the foundation is constructed either of poured concrete or concrete block. When the excavation has been completed and the foundation installed in the manner shown in the drawings, a layer of water impervious material 30 is laid on the surface 32 of the earth. The layer 30 is a large plastic sheet, preferably having walls 34 extending upwardly along the footing or foundation. A loose material 36 such as sand, small gravel or crushed stone is placed in a layer of four to eight inches in thickness on layer 30. The material which is used preferably will not pack, and should have a large number of pores or interstices between the particles which contain air in sufficient amounts to make layer 36 an effective heat insulating barrier.

As the particulate material 36 is poured into the lower portion of the excavated area, a perforated tube system 40 is embedded therein, the system shown in the drawings consisting of five parallel perforated tubes 42, 44, 46, 48, and 50, all of the tubes being connected to a pump 60 by a manifold tube 62 and outlet tube 64. With this construction, when pump 60 is operating, water contained in layer 36 is withdrawn through the five tubes by the pump and discharged into a sewer or other suitable drainage system through pipe 66. The tubes should be placed in the center or lower portion of layer 36 so that they can effectively withdraw the water from layer 36 near the bottom thereof. The purpose of removing the water is to permit the air to flow into the space between the particles as the water is removed therefrom, thereby providing the desired insulating effect in layer 36. In order to facilitate the inflow of air to layer 36 to replace the water removed, a vent tube 68 extending from layer 36 to a point above the ground, either inside or outside of the building structure, may be used, and this tube may have a valve 69 for closing the vent when pump 60 is not in operation. In any event, a source of relatively dry air for replacing the removed water is required for effective operation of the system.

Pump 60 is normally operated intermittently, either by manual or automatic controls, when the amount of water in layer 36 has risen to a point such that the insulating effect is materially reduces. Probes 70, 72, 74 and 76 are buried in layer 36 and are connected to a gauge or pump control, indicated schematically at numeral 78, the various probes being connected to the gauge or pump control by a plurality of leads 80. Various configurations of the tubes in the water removal system may be used, and the tubes may be either plastic or metal and, instead of being perforated, may be connected to perforated heads or drains buried at various locations throughout the layer.

After layer 36 and the water removal system have been installed in the manner described herein, a layer of water impervious material 82 is laid on top of layer 36 and insulating layer 84 may be placed on top of layer 82. A water impervious sheet material 86 may also be placed around the inside of the foundation, and heat insulating material 88 may be used to further prevent the escape of heat through the foundation into the surrounding earth. An electric heating cable 90 is buried in the fill material 18 in a circuitous path normally throughout most of the horizontal area of the fill material. This heating cable is preferably located in the top portion at a depth of not more than about five or six inches, and may be placed on a flexible frame or support 92, and the cable and frame are frequently formed as a unit and placed on the partially filled fill material, either as a single unit or as several units, when the fill material is poured into the area within the confines of the foundation walls. After the fill material has been poured into the excavation and the heating element inserted therein, a concrete floor 94 is normally poured on the fill material in direct contact therewith. Thus, after the fill material is heated by electric heating cables 90, the material releases the absorbed heat through the floor into the living space thereabove. Either as a supplemental system or as a system used in place of the heating system just described, a heating cable such as that shown at numeral 96 may be embedded in the concrete floor. As this cable heats the concrete floor, some heat is transmitted to the fill material where it is stored until the living space above the floor cools sufficiently to cause the heat to flow upwardly from the fill material through the floor into the living space to be heated.

In the use and operation of the present heat loss control system installed in a manner described herein, the particulate material 36 such as sand, initially may contain a substantial amount of moisture. In order to prepare it for effective insulation, pump 60 is operated until substantially all the water is removed from the interstices in the material, and this water is replaced by relatively dry air admitted through vent tube 68. Thereafter, during the operation of the heating system, if moisture or water in any substantial amount finds its way into material 36, it is sensed by probes 70, 72, 74 and/or 76 and is registered on gauge 78. An operator will be able to read the gauge and start and operate pump 60 to reduce the amount of moisture in material 36 and thereby increase the insulating characteristics of the material. As an alternative, the probes may be connected to a control which will automatically start the operation of electrically driven pump 60 and will automatically turn off the pump when the moisture has reached a preselected minimum level. Normally, since layer 36 is enclosed in plastic sheets 30, 34 and 82, the amount of moisture which can find its way into layer 36 is restricted, so that the layer will retain its effectiveness as a thermal barrier between fill material 18 and the earth for extended periods of time.

The thickness of material 36 may be varied, and in some installations the heat insulating material 84 may be omitted, using only moisture impervious sheet or layer 82 to separate the heat absorbing material 18 from the insulating material 36. Further, the arrangement of tubes may be different from that shown in the drawings, provided they cover sufficient area in material 36 to remove the water efficiently therefrom. While only one embodiment of the present heat loss control system for building heat sumps, and several modifications thereof, have been described in detail herein, various changes may be made without departing from the scope of the invention.

I claim:

1. A heat sump system for building structures, comprising side walls defining an inner area with earth beneath said area, heat absorbing and releasing fill material in said space, an insulating layer of porous material disposed between said fill material and the earth, means for removing moisture from said layer and maintaining said layer in an effective heat insulating condition, layer means substantially impervious to water separating said fill material from said insulating layer, a floor above said fill material, and an electrical heating means for heating said fill material.

2. A heat sump system for building structures as defined in claim 1 in which said means for removing moisture from said layer and maintaining the layer in effective insulating condition consists of perforated tubes buried in said layer and a pump means is connected to said tubes.

3. A heat sump system for building structures as defined in claim 1 in which probes are disposed in spaced relation to one another in said layer for creating a signal when the moisture in said layer increases to a predetermined level.

4. A heat sump system for building structures as defined in claim 2 in which probes are disposed in spaced relation to one another in said layer for creating a signal when the moisture in said layer increases to a predetermined level.

5. A heat sump system for building structures as defined in claim 1 in which an air vent is connected to said layer.

6. A heat sump system for building structures as defined in claim 4 in which a conduit forms an air vent for said layer and a valve controls the flow of air through said conduit.

7. In a heat sump system for building structures having side walls defining an inner area with earth disposed beneath said area, heat absorbing and releasing fill material substantially filling in said area, a floor on the upper surface of said fill material, and a means for heating said fill material: an insulating layer of porous material disposed between said fill material and the earth therebelow, means for removing the moisture from said layer and maintaining said layer in an effective heat insulating condition, layer means of substantially water impervious material separating said fill material from said insulating layer.

8. A heat sump system for building structures as defined in claim 7 in which a layer means substantially impervious to water is disposed between said layer and the earth.

9. A heat sump system for building structures as defined in claim 7 in which a layer means substantially impervious to water is disposed around the sides of said layer.

10. A heat sump system for building structures as defined in claim 7 in which said means for removing moisture from said layer and maintaining the layer in effective insulating condition consists of perforated tubes buried in said layer and a pump means is connected to said tubes.

11. A heat sump system for building structures as defined in claim 7 in which probes are disposed in spaced relation to one another in said layer for creating a signal when the moisture in said layer increases to a predetermined level.

12. A heat sump system for building structures as defined in claim 7 in which a conduit forms an air vent for said layer and a valve controls the flow of air through said conduit.

* * * * *